United States Patent

[11] 3,523,545

| [72] | Inventor | Merritt B. Sampson<br>Shaker Heights, Ohio |
|---|---|---|
| [21] | Appl. No. | 719,512 |
| [22] | Filed | April 8, 1968 |
| [45] | Patented | Aug. 11, 1970 |
| [73] | Assignee | The S-P Manufacturing Corporation |

[54] FLUIDIC SIGNAL GENERATOR
12 Claims, 8 Drawing Figs.

[52] U.S. Cl. .................................................. 137/82,
137/624.13
[51] Int. Cl. ...................................................... G05d 16/20
[50] Field of Search ............................................ 137/82, 85,
124.13, 124.15, 624.18, 124.2, 81.5

[56]  References Cited
UNITED STATES PATENTS

| 2,717,611 | 9/1955 | Lerousseau | 137/82X |
| 2,718,878 | 9/1955 | Du Bois | 137/82X |
| 3,260,456 | 7/1966 | Boothe | 137/81.5X |
| 3,347,252 | 10/1967 | Hanson | 137/82 |

*Primary Examiner*— Alan Cohan
*Attorney*—Watts, Hoffmann, Fisher and Heinke

ABSTRACT: A device for producing a periodically varying fluid flow from an essentially uniform fluid input, for generating a signal input to a fluidic device.

Patented Aug. 11, 1970 3,523,545

INVENTOR.
MERRITT B. SAMPSON
BY
Watts, Hoffmann, Fisher & Heinke
ATTORNEYS.

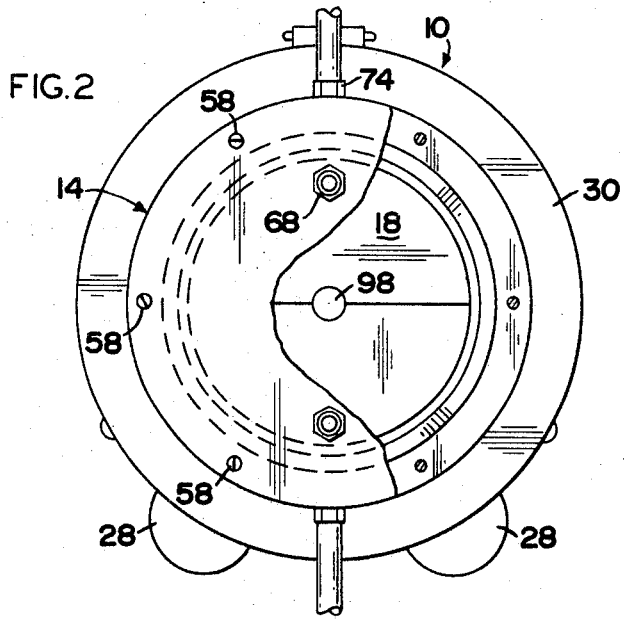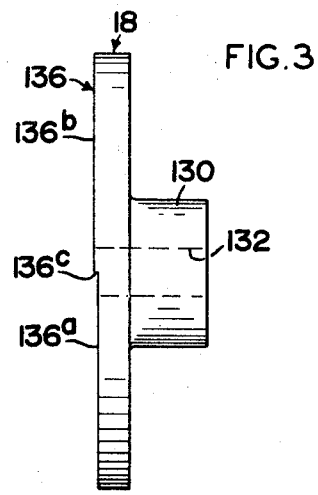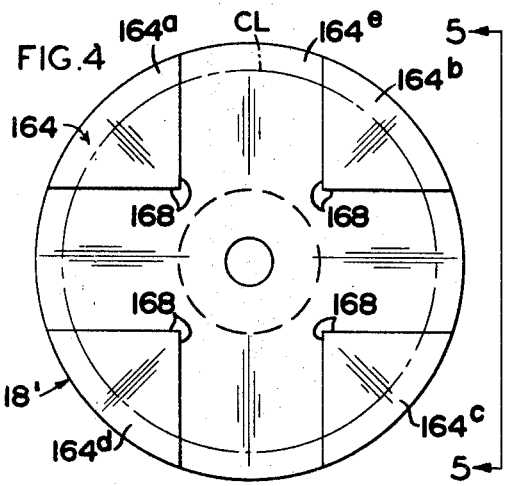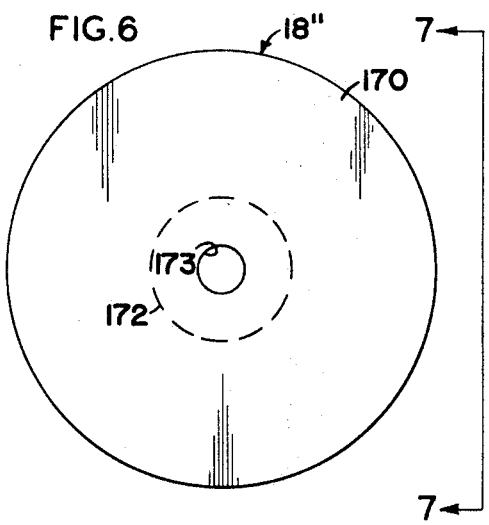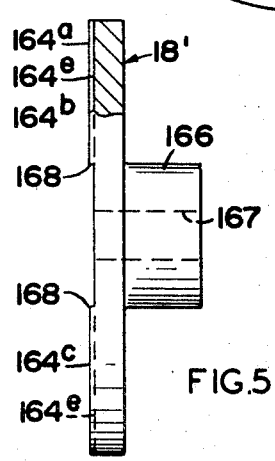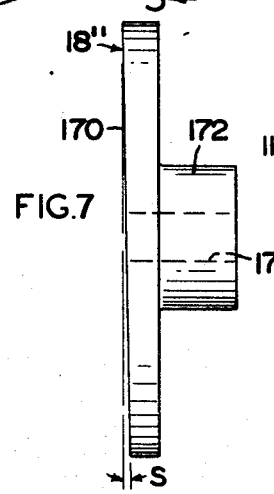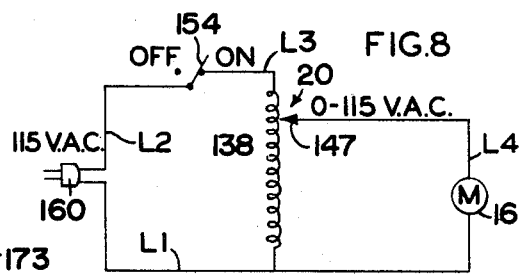
INVENTOR
MERRITT B. SAMPSON
BY
Watts, Hoffmann, Fisher & Heinke
ATTORNEYS.

FLUIDIC SIGNAL GENERATOR

This invention relates to fluidics and more particularly to a fluid signal generator.

In the art of fluidics, i.e., the technology wherein sensing control, information processing, and/or actuation functions are performed by utilizing fluid dynamic phenomena, various components have been devised to utilize the fluid dynamic phenomena and which are capable alone or in combination of performing given functions, such as logic functions or the like. Such components typically produce output signals in response to a fluid input signal. In many instances it is necessary or desirable to determine whether a given component is functioning properly or will function properly in operation. This can be accomplished by applying a known signal input to the component and monitoring the output. In other instances fluidic devices directly utilize a signal input of known frequency to perform an intended function.

It is a principal object of the present invention to provide novel apparatus for producing a fluid signal of known characteristics useable as an input to a fluidic component.

It is another object of this invention to provide apparatus of the type referred to which produce a fluid flow of periodically varying pressure and flow rate from a fluid input of essentially uniform pressure and flow rate.

It is a further object of this invention to provide apparatus of the type referred to which is compact and portable, relatively inexpensive to manufacture, reliable in operation, and which is constructed to produce precise fluid output signals of specific wave form such as a square wave or sine wave over a wide range of selected frequencies.

Basically, the present invention utilizes a rotator to obstruct to a periodically varying extent a uniform flow of fluid and to produce therefrom a periodically varying output flow. The rotator has a control surface that is spaced from but closely adjacent to a first discharge orifice of a fluid input conduit and which is contoured to produce a variation in the space or gap between it and said discharge orifice during rotation of the rotator. Fluid in the input conduit escapes through said gap and also through a second discharge orifice in the conduit. The pressure and flow rate of the fluid escaping through the second discharge orifice vary inversely with the size of the gap and provide a fluid signal output that is a function of the control surface contour and the rotational speed of the rotator and that can be used an an input of known characteristics to a fluidic device. To assure a uniform signal output of selected characteristics, the rotator is (a) supported on a drive shaft journaled in spaced bearings preloaded axially to minimize axial movement of the shaft which would affect the gap between the first discharge orifice and the rotator control surface and (b) driven by a transducer of variable speed that can accurately maintain selected rotational speeds. More specifically, the rotator is mounted on the rotor shaft of a universal electric motor in which the rotor shaft is journaled in spaced preloaded bearings, the motor is operated on alternating current, and the speed is varied with a variable voltage transformer. The motor can be driven at speeds of from 60 to 15,000 revolutions per minute (r.p.m.). Rotators are provided with control surface contours having one or more steps to produce square wave output signals for use with digital devices and with a progressively varying surface contour to produce sine wave output signals for use with analog devices.

Other features, objects and advantages of this invention will become apparent from the following detailed description when considered in conjunction with the accompanying drawings, in which:

FIGURE 2 is an end elevational view, with parts broken away, of the fluidic signal generator of FIGURE 1, viewed from the left hand side;

FIGURE 3 is a side elevational view of one preferred construction of a rotator for use with the signal generator to produce a square wave fluid signal;

FIGURE 4 is another preferred embodiment of a rotator that produces a square wave fluid signal of higher frequencies for a given rotational speed than the rotator of FIGURE 3;

FIGURE 5 is a side elevational view with a part in section of the rotator of FIGURE 4, taken approximately along the line 5-5 of FIGURE 4;

FIGURE 6 is a plan view of a rotator for use with the fluid signal generator of FIGURE 1 for producing a sinusoidal wave form output;

FIGURE 7 is a side elevational view of the rotator of FIGURE 6 taken approximately along the line 7-7 of FIGURE 6; and FIGURE 8 is an electrical wiring diagram illustrating the manner in which the electric motor of the signal generator is controlled.

Figure 1:
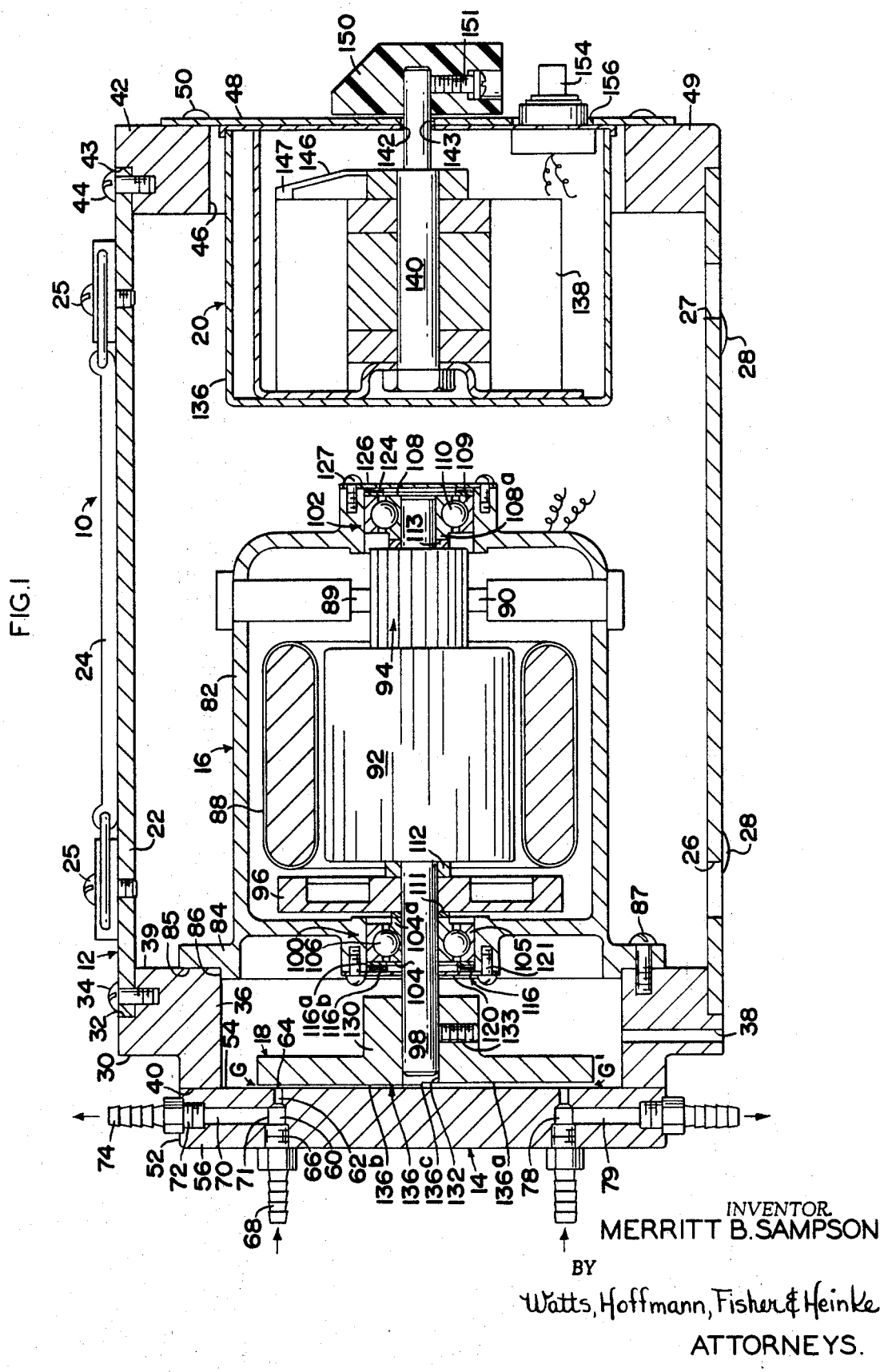
FIGURE 1 is a longitudinal sectional view of a fluidic signal generator embodying the present invention.

Referring now to the drawings, a fluid signal generator embodying the present invention is indicated generally at 10 in FIGURES 1 and 2. The basic components include a housing 12, an end plate 14, a universal electric motor 16, a rotator 18, and a variable voltage transformer 20.

The housing 12 is cylindrical in shape, provides an enclosure for the motor, wires and transformer, and provides a support for the end plate 30. The housing includes a cylindrical wall 22 to which a carrying handle 24 is attached, as by screws 25. Ventilating openings 26, 27 in the cylindrical wall 22 provide for the circulation of air to cool the motor 16. Four rubber feet 28 (FIGURE 2) are secured to the cylindrical wall 22 generally opposite the carrying handle 24 so that the housing will rest in a stable manner on a supporting surface. A front end ring 30 is partially received within one end of the cylindrical wall 22. This ring supports the end plate 14 and motor 16 in predetermined relationship. A radial shoulder 32 formed in the outer periphery of the end ring 30 abuts the end of the cylindrical wall. Peripherally spaced screws 34 extend radially through the cylindrical wall 22 and are received in tapped holes of the portion of the front end ring 30 that is received within the end of the cylindrical wall. The ring 30 includes a central opening 36 that receives and encircles the rotator 18. A plurality of peripherally spaced radial passageways, one of which is shown at 38 in FIGURE 1, extend through the ring 30 to permit fluid to escape from within the central opening 36 to the outside of the housing. The ring 30 has a flat inside surface 39 against which the motor 16 is mounted, and has a flat outside surface 40 against which the end plate 14 is secured. Both surfaces 39, 40 are accurately machined parallel to each other. A rear end ring 42 is partially received within the opposite end of the cylindrical wall 22 from the front end ring and has a radial shoulder 43 that abuts the end of the cylindrical wall 22. Screws 44 extend radially through the cylindrical wall 22 at peripherally spaced locations and are received in tapped holes in the ring 42. The ring 42 has a central opening 46 covered by a mounting plate 48 that supports the variable voltage transformer 20. The plate 48 is secured to the outer end surface 49 of the ring 42 by screws 50.

The end plate 14 is secured to the front end ring 30 and provides fluid conduits and orifices that receive a fluid input flow and emit a fluid signal output. The end plate 14 is generally circular in shape, as illustrated in FIGURE 2, is of substantial thickness so that passageways can be formed therein, has a cylindrical outer periphery 52, a radial surface 54 facing inward and machined flat that abuts the flat outside surface 40 of the front end ring 30, and has a generally parallel and flat outer end surface 56. The end plate 14 is secured to the front end ring 30 by screws 58 (FIGURE 2). A fluid input conduit 60 extends through the thickness of the end plate 14, preferably perpendicular to the machined inside surface 54. The conduit includes a restriction 62, a discharge orifice 64 opening through the inner surface 54 and a threaded inlet portion 66 at the outer surface 56. A tube-receiving nipple or fitting 68 is received in the threaded inlet portion 66. A fluid output conduit 70 intersects the conduit 60 forming an orifice 71 therein between the threaded inlet portion 66 and the outlet orifice 64 and restriction 62. The output conduit 70 extends transversely of the input conduit, preferably at right angles thereto, radially within the end plate 14. The fluid output conduit is unrestricted and has a threaded outlet end portion 72 that receives the threaded end of a tube-receiving nipple or fitting 74. A second fluid input conduit 78 and associated output conduit 79 are formed in the end plate 14 diametrically opposite the input and output conduits 60, 70. These second conduits 78, 79 are constructed identically to the conduits 70, 79 and will not be described in detail. Each pair of conduits functions independently of the other, thus two separate inputs and two separate signal outputs are provided.

The motor 16 is secured to the inside surface 29 of the front end ring 30 and serves to support and drive the rotator 18. The motor 16 includes a motor housing 82 with a flanged front end shield 84 having a flat radial front flange surface 85 that abuts the inside surface 39 of the front end ring 30. An annular locating surface 86 extending axially forward from the radial front flange surface 85 fits within the central opening 36 of the front end ring 30 and together with the front flange surface 85 accurately locates the motor housing 82 with its central longitudinal axis perpendicular to the end plate 14. Mounting screws 87 secure the end shield 84 to the inner surface of the ring 30. Stationary windings or poles 88 and brushes 89, 90 are secured to the motor housing 82. An armature 92, commutator 94 and ventilation fan 96 are rotatably mounted within the motor housing 82 on a shaft 98. The shaft 98 is mounted at opposite ends of the housing in bearings 100 at the front of the motor and 102 at the back of the motor. The front bearing 100 includes an inner bearing ring 104 secured to the shaft 98, an outer bearing ring 105 mounted in the housing 82 and a race of ball bearings 106 between the rings. Similarly, the rear bearing 102 includes an inner ring 108 secured to the shaft 98, an outer ring 109 mounted in the motor housing 82 and a race of ball bearings 110 between the two. The two inner bearing rings 104, 108 are spaced from each other along the shaft 98 by the armature 92, commutator 94, fan 96, and spacers 111, 112, 113, Each inner ring 104, 108 has an inwardly facing boss 104a, 108a that extends axially beyond the associated outer ring so that the outer rings can be biased inward toward each other without obstruction. A stepped annular spring 116 bears at its inner generally annular end 116a against the outer bearing ring 105 and at its outer surface with projecting portions 116b against an end plate 120 that surrounds the shaft 98 and is secured by screws 121 to the motor housing 82. A similar stepped annular spring 124 bears at its inner end against the outer bearing ring 109 and at its outer end against an end plate 126 secured to the end of the motor housing 82 by screws 127. With this construction and arrangement, the annular springs 116, 124 apply inward axial forces to the outer bearing rings 105, 109 and thereby apply an axial load to the shaft 98 in opposite inward directions through the ball bearings 106, 110 and the inner bearing rings 104, 108. This axial preloading effectively inhibits axial movement or play of the shaft 98 and thereby assures that the rotator 18 will be maintained in a predetermined relationship with respect to the end plate 14. A particularly suitable motor 16 is a "Bodine Type N" motor, model No. 004, catalog No. B2190, 1/20 horsepower 115 volt universal (A.C.-D.C.) series motor, manufactured and sold by The Bodine Electric Company, Chicago, Illinois.

The rotator 18 is carried by the motor shaft 98 and during rotation periodically varies the amount of fluid that can escape through the discharge orifices of input conduits 60, 78. The rotator 18, as shown in FIGURES 1, 2 and 3, is circular in front elevation, has a rearwardly extending central hub 130 and a central through bore 132 that receives the end of the shaft 98. A set screw 133 in the hub 130 secures the rotator 18 in fixed position on the shaft 98. The front radial end face 136 of the rotator 18 is a stepped surface divided along a diameter into radial surfaces 136a, 136b of equal area in parallel planes that are displaced axially from each other. A perpendicular surface 136c joins the two surfaces 136a, 136b. The surface 136b, as best shown in FIGURE 1, is closely adjacent the inwardly facing surface 54 of the end plate 14 to provide a small gap G therebetween. This gap G is less than 0.005 inch and preferably is 0.002 inch. A gap G' is provided between the surface 136a and the inner surface 54 of the plate 14 and is preferably 0.01 inch. With this construction, during each revolution of the rotator 18, the portions 136a, 136b of the control surface 136 will be located opposite the discharge orifice of each inlet conduit 60, 78 for an equal period of time. Also, the change in the gap between the control surface and the end plate 14 opposite a discharge orifice will occur essentially instantaneously. As will be described in more detail subsequently, this produces a fluid signal output in the form of a square wave, at a frequency of one cycle for each revolution of the rotator.

The variable voltage transformer is electrically connected to the universal motor 16 and can be adjusted to vary the input voltage to the motor and thereby control the rotational speed of the shaft 98 and the rotator 18, thereby varying the frequency of the fluid signal generated. The transformer 20 has a casing 136 that is secured to the rear end mounting plate 48 of the housing 12. An annular core and surrounding coil windings 138 are supported within the casing 136. A central shaft 140 extends axially through the annular core and coil windings and through an aperture 142 in the casing 136 and an aperture 143 in the end plate 48. A brush spring 146 and a brush 147 at the end of the spring are secured to the central shaft 140 and rotate with the shaft. The brush 147 contacts the coil windings, which are bared to form a commutator for the brush. An alternating current input is applied across the coil windings 138 and the desired alternating current voltage is tapped by sliding the brush 147 from turn to turn. Contact area of the brush 147 spans more than one turn of the coil windings so that the output circuit is not broken as the brush is moved. A setting knob 150 is secured by a set screw 151 to a portion of the shaft 140 that extends beyond the end plate 48 and is used to adjust the voltage output from the transformer. An on-off power switch 154 is mounted on the casing 136 and extends through an aperture 156 in the end plate 48. A suitable variable voltage transformer for controlling the universal motor described above is a type 10B transformer manufactured and sold by The Superior Electric Co., Bristol, Connecticut.

An electrical wiring diagram of the power and control circuit to the motor 16 is shown in FIGURE 8 of the drawings. As shown, the motor is connected to a 115 volt a.c. current source by a plug 160. Two electrical lines extend from the plug 160, line L1 connected to the motor 16 and line L2 connected to the switch 154. A line L3 from the switch 154 is connected to the coil windings 138 of the transformer 20. The opposite end of the coil 138 is connected to the line L1 so that the motor 16 and coil 138 are in parallel. The motor 16 is connected by a line L4 to the brush 147 of the transformer 20, which can be moved along the coil 138 to vary the voltage to the motor from zero to full line voltage.

A second embodiment of a rotator 18' is shown in FIGURES 4 and 5 of the drawings. This embodiment is constructed to provide a higher and greater frequency range for the same shaft rotation as compared with the rotator 18, and produces four square wave cycles (i.e., four complete sets of alternating recurring values) each revolution. The rotator 18' has a control surface 164 with four segments or portions 164a, b, c, d in a first plane adjacent the periphery, and a portion 164e in the form of a cross separating the other portions and located in a second plane recessed from the first. A rearwardly extending hub 166 with a through bore 167 supports the rotator 18' on the end of the shaft 98 in the same manner as the shaft 18 is supported. An imaginary circular line CL is shown on the control surface 164 in FIGURE 4. This line represents the center of an annular portion of the control surface that moves past the discharge orifice of each input conduit 60, 78. The segments 164a, b, c, d and the recessed segment 164e are constructed so that the length of the imaginary circular line CL is the same along each segment 164a, b, c, d as across the adjacent recessed portion 164e between each segment. As a result, when the rotator 18' is rotated, the control surface 164 alternately produces gaps of two different sizes between the discharge orifices of the inlet conduits 60, 78 and the rotator for equal periods of time. Because the surfaces 164a, b, c, d and the surface 164e are flat and the juncture between the surfaces is formed by perpendicular wall portions 168, the transition from one gap to the other is abrupt and a square wave form is produced. The particular construction of the control surface facilitates manufacture. The control surface 164 is first machined flat and the recessed surface 164e is formed by passing a milling cutter of the proper diameter across the face in two paths at right angles to each other.

Another embodiment of a rotator 18" is shown in FIGURES 6 and 7 of the drawings. This rotator is circular in shape, has a front control surface 170, a rearwardly extending hub 172, and a through bore 173 for supporting the rotator on the shaft 98. The control surface 170 is flat, but as indicated at S in FIGURE 7 the plane of the control surface 170 is slightly skewed from a plane perpendicular to the central longitudinal axis of the through bore 173. With this construction, rotation of the rotator 18" will provide a continuously varying gap between the control surface 170 and the discharge orifices of the inlet conduits 60, 78. The gap will progressively change from its maximum value to a minimum and back to its maximum during each revolution of the rotator to provide one complete cycle of pressure and flow variation in the output conduits during each revolution. The contour of this control surface produces a sinusoidal wave form output. The control surface 170 is angularly displaced from a perpendicular plane to the axis of rotation by an amount sufficient to produce a variation in the gap between the plate and the discharge orifice of the inlet conduit of about 0.007 to 0.009 inch. For example, where a minimum gap of 0.002 is established, the maximum gap may be 0.009.

In operation, a fluid input, such as air under constant pressure is introduced through one or both of the inlet conduits 60, 78, it being understood that each inlet conduit and its associated outlet conduit functions independently from the other. Input fluid is suitably provided by attaching a tube from a source to the nipple or fitting 68. A typical pressure might be on the order of 1.5 pounds per square inch gauge. Considering the inlet conduit 60, a portion of the input flow passes through the restriction 62, is reduced somewhat in pressure, and is emitted through the discharge orifice 64. Concurrently, a portion of the flow passes through the outlet conduit 70, which communicates with the conduit 60 between the inlet and the discharge orifice 64. Typically, this outlet flow is received by a tube connected to the fitting or nipple 75 and is conducted to the input of a fluidic device. With the rotator 18 positioned as shown in FIGURE 1, i.e., with the control surface portion 136b opposite the discharge orifice 64, the smaller gap G is formed between the control surface and the discharge orifice 64 and the flow of fluid through the discharge orifice 64 is substantially restricted. As a result, the pressure and flow rate of fluid through the outlet conduit 70 is relatively great. This condition is maintained until the step portion 136c passes beneath the discharge orifice and the control surface 136a establishes the larger gap G' opposite the discharge orifice. The gap G', being many times greater than the gap G, permits a substantial flow of fluid from the inlet conduit 60 through the discharge orifice 64. The pressure and flow rate of fluid emitted from the outlet conduit 70 is therefore substantially decreased. Where the change in the control surface of the rotator is abrupt as in the change from the gap G to the gap G' with the rotator 18, the pressure and flow rate in the outlet conduit 70 will also change abruptly and will vary between two levels during each revolution of the rotator. The average pressure output from the outlet conduit 70 may typically be about 0.3 pound per square inch gauge, but this value can be varied by changing the input flow. Fluid flow emitted through the discharge orifice 64 is received in a chamber or zone formed by the front end ring 30, the motor housing 82 and the front end wall 14. This zone is of relatively large volume to accommodate the inflow of fluid, which then escapes through the radial passageways 38 to the atmosphere. Sufficient radial passageways 38 are provided to afford adequate exhaust to prevent the build-up of back pressure that would adversely affect the discharge of the gas from the orifice 64. This apparatus can also be operated by providing an inflow of fluid through the conduits 70, 79 to produce pressure variations in a resulting output flow through the conduits 60, 78, which in the sense of the fluid flow are intermediate the respective fluid inlet and discharge orifice.

The operation of the signal generator with the rotator 18' is substantially identical to that described, except that the gap between the discharge orifice 64 and control surface 164 of the rotator is varied eight times during each revolution so as to produce four complete cycles. With the rotator 18", the size of the gap between the control surface 170 and the discharge orifice 64 is continuously varied from a maximum to a minimum and back to a maximum gap during each revolution of the rotator, providing one complete cycle each revolution in which the pressure and flow rate of the output varies sinusoidally.

A square wave fluid output signal is used as an output for digital fluidic devices. In practice, it is desirable to provide square wave signal inputs of frequencies that can be varied from 1 to 1,000 cycles per second for use with different fluidic devices and under different conditions. It is, of course, difficult to obtain such a range of frequencies with a rotating member while maintaining high accuracy, especially at a reasonable cost. This problem has been overcome with the present invention. The motor 16, when operated on alternating current, can be controlled through the variable transformer 20 to rotate at speeds from 60 to 15,000 revolutions per minute and will maintain such speed constant within plus or minus 1%. Where relatively low frequencies are desired, the rotator 18 is used and provides frequency outputs of 1 cycle per second to 250 cycles per second. Where a higher frequency range is desired, the rotator 18' is used and produces a signal output range of 4 to 1,000 cycles per second at shaft speeds of 60 to 15,000 revolutions per minute.

For analog type fluidic devices, a sinusoidal signal output is desired, usually of relatively low frequency. Accordingly, the rotator 18" will provide a sinusoidal signal output of 1 to 250 cycles per second.

From the foregoing description of the preferred embodiments of this invention, will be apparent that the objects heretofore enumerated and others have been accomplished and there has been provided a novel fluid signal generator that will produce a wide range of signal outputs and that is accurate and reliable in operation and economical to fabricate. In particular, novel rotator and housing construction has been provided which facilitate the use of a commercially available electric motor to provide a rotator drive of accurate speed and a support that assures constancy of the rotator location relative to the inlet conduit discharge orifice so that the amplitude of the output wave will remain constant with a constant input flow. The housing construction especially facilitates changing rotators without disturbing the rotator shaft, drive, or shaft supporting components.

Although the invention has been described with particularity, it will be understood that various modifications or alterations may be made in the specific construction disclosed, without departing from the spirit and scope of the invention, as set forth in the appended claims.

I claim:

1. A device for producing a fluid flow of periodically varying pressure from a fluid input of essentially uniform pressure and flow rate, which comprises: a housing; a shaft within the housing; a transducer for rotatably driving the shaft; means for mounting the shaft for rotation within the housing, said means including two shaft bearings spaced along the shaft, in fixed locations within the housing and compressively preloaded toward each other axially of said shaft; a rotator within said housing fixed to and rotatable with said shaft, said rotator having a surface extending generally radially relative to the longitudinal axis of rotation of said shaft; and a conduit having an inlet adapted to receive input flow of fluid of essentially uniform pressure and flow rate, a first discharge orifce adjacent said radially extending surface of the rotator and a second discharge orifice between the inlet and said first discharge orifice adapted to emit a fluid flow the pressure of which varies periodically; the surface of said rotator that extends generally radially relative to the axis of said shaft being contoured so that the distance between said rotor surface and said first discharge orifice varies periodically during rotation of the rotator.

2. A device as set forth in Claim 1 including control means within said housing for selectively varying the speed at which the transducer drives the shaft.

3. A device as set forth in Claim 1 wherein said surface of the rotator includes portions in two different planes spaced longitudinally relative to the axis of rotation of said shaft and connected by a portion perpendicular to the portions in different planes.

4. A device as set forth in Claim 3 wherein said surface portions of the rotator in two different planes are equal in area and identical in shape.

5. A device as set forth in Claim 3 wherein said surface portions in one of said planes are continuous and recessed from the surface portions in the other of said planes, which are in the form of separate segments spaced apart by said continuous surface portions.

6. A device as set forth in Claim 1 wherein said surface of the rotator is flat and lies in a plane skewed from the perpendicular to the longitudinal axis of said shaft.

7. A device for producing a fluid flow of periodically varying pressure from a fluid input of essentially uniform pressure and flow rate, which comprises: a housing; a universal electric motor secured within the housing and having an armature shaft supported by two shaft bearings spaced along the shaft and compressively preloaded toward each other axially of said shaft; a rotator within said housing fixed to and rotatable with said shaft, said rotator having a surface extending generally radially relative to the longitudinal axis of rotation of said shaft; a conduit having an inlet adapted to receive an input flow of fluid of essentially uniform pressure and flow rate, a first discharge orifice adjacent said radially extending surface of the rotator and a second discharge orifice between the inlet and said first discharge orifice adapted to emit a fluid flow the pressure of which varies periodically; the surface of said rotator that extends generally radially relative to the axis of said shaft being contoured so that the distance between said rotor surface and said flat inner surface varies periodically during rotation of the rotator; and a variable voltage transformer secured within said housing electrically connected to supply alternating current to said motor and to control the speed at which said armature shaft rotates.

8. A device for producing a fluid flow of periodically varying pressure from a fluid input of essentially uniform pressure and flow rate, which comprises: a housing; a shaft within the housing; a transducer for rotatably driving the shaft; means for mounting the shaft for rotation within the housing, said means including two shaft bearings spaced along the shaft in fixed locations within the housing and compressively preloaded toward each other axially of said shaft; a rotator within said housing fixed to and rotatable with said shaft, said rotator having a surface extending generally radially relative to the longitudinal axis of rotation of said shaft; a first conduit having an inlet adapted to receive an input flow of fluid of essentially uniform pressure and flow rate and a discharge orifice adjacent said radially extending surface of the rotator; and a second conduit communicating with said first conduit intermediate the inlet and the discharge orifice of the first conduit and having a discharge orifice adapted to emit a fluid flow the pressure of which varies periodically; the surface of said rotator that extends generally radially relative to the axis of said shaft being contoured so that the distance between said rotor surface and the discharge orifice of said first conduit varies periodically during rotation of the rotator.

9. A device for producing a fluid flow of periodically varying pressure from a fluid imput of essentially uniform pressure and flow rate, which comprises: a housing; a universal electric motor secured within the housing and having an armature shaft supported by two shaft bearings spaced along the shaft and compressively preloaded toward each other axially of said shaft; a rotator within said housing fixed to and rotatable with said shaft, said rotator having a surface extending generally radially relative to the longitudinal axis of rotation of said shaft; a housing portion having a flat inner surface perpendicular to the axis of rotation of said shaft and directly adjacent to but spaced slightly from said generally radially extending surface of said rotator; a first passageway through said housing portion providing an inlet port at the outside of said housing and terminating in an orifice in said flat inner surface; a second passageway within said housing portion communicating between said first passageway and an outlet port at the outside of said housing, said second passageway extending perpendicular to said first passageway; and an opening through said housing adjacent said rotator to facilitate the escape of fluid introduced to said housing through said first passageway; the surface of said rotator that extends generally radially relative to the axis of said shaft being contoured so that the distance between said rotor surface and an orifice in said flat inner surface varies periodically during rotation of the rotator.

10. A device as set forth in Claim 9 including a variable voltage transformer secured within said housing electrically connected to supply alternating current to said motor and to control the speed at which said armature shaft rotates.

11. A device as set forth in Claim 10 wherein said housing includes an end ring having flat, parallel, opposite radial surfaces; said housing portion is an end plate with a flat inner surface that abuts against a radial surface of said end ring; said motor is secured at one end to the opposite radial surface of said end ring with the armature shaft extending through said ring.

12. A device for producing a fluid flow of periodically varying pressure from a fluid input of essentially uniform pressure and flow rate, which comprises: a housing; an electric motor secured within the housing and having an armature shaft supported by two shaft bearings spaced along the shaft; a rotator within said housing removably secured in fixed relationship to and rotatable with said shaft, said rotator having a contoured surface; a housing portion having an inner surface directly adjacent to but spaced slightly from said contoured surface of said rotator, said housing portion being removably secured to said housing, defining with said housing and said electric motor a chamber in which said rotator is located, and being of a size sufficient to permit removal of said rotor from within the housing when said housing portion is removed; a first passageway through said housing portion providing an inlet port at the outside of said housing and terminating in an orifice in said inner surface directly adjacent the contoured surface of said rotator; a second passageway within said housing portion communicating between said first passageway and an outlet port at the outside of said housing; and an opening through said housing adjacent said rotator to facilitate the escape of fluid introduced to said housing through said first passageway; the contoured surface of said rotator being constructed so that the distance between said contoured surface and the orifice in said flat inner surface varies periodically during rotation of the rotator.

75